(12) United States Patent
Ambrose et al.

(10) Patent No.: US 11,167,942 B2
(45) Date of Patent: Nov. 9, 2021

(54) SYSTEMS, DEVICES, AND METHODS FOR PROMOTING BULK POWDER FLOW

(71) Applicant: Purdue Research Foundation, West Lafayette, IN (US)

(72) Inventors: Rose Prabin Kingsly Ambrose, West Lafayette, IN (US); Karthik Salish, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/886,046

(22) Filed: May 28, 2020

(65) Prior Publication Data

US 2020/0391964 A1 Dec. 17, 2020

Related U.S. Application Data

(60) Provisional application No. 62/853,249, filed on May 28, 2019.

(51) Int. Cl.
| | |
|---|---|
| *B65G 69/08* | (2006.01) |
| *B65G 43/00* | (2006.01) |
| *B65G 27/20* | (2006.01) |
| *B65D 88/66* | (2006.01) |

(52) U.S. Cl.
CPC ............ *B65G 69/08* (2013.01); *B65D 88/66* (2013.01); *B65G 27/20* (2013.01); *B65G 43/00* (2013.01)

(58) Field of Classification Search
CPC ........ B65D 88/66; B65G 69/08; B65G 27/20; B65G 43/00

USPC ......................................... 222/198
See application file for complete search history.

(56) References Cited

U.S. PATENT DOCUMENTS

| | | | | |
|---|---|---|---|---|
| 2,905,365 | A | * | 9/1959 | Thayer ................... B65D 88/66 222/198 |
| 4,522,500 | A | * | 6/1985 | Hyer .................... B01F 11/0266 222/198 |
| 5,533,650 | A | * | 7/1996 | Conrad .................. B65D 88/66 222/161 |
| 6,889,874 | B2 | * | 5/2005 | Vohwinkel ............. B65D 88/32 222/198 |

(Continued)

OTHER PUBLICATIONS

ASABE, Jan. 1992 (R2017), ANSI/ASAE D274.1; "Flow of Grain and Seeds Through Orifices", ASABE, St. Joseph, MI, (7 pages).

(Continued)

*Primary Examiner* — James R Bidwell
(74) *Attorney, Agent, or Firm* — Hartman Global IP Law; Gary M. Hartman; Domencia N. S. Hartman (57) ABSTRACT

Portable flow aid devices, systems, and methods for promoting bulk powder flow in containers. The portable flow aid devices include a housing having an enclosed internal cavity therein, and at least two vibration motors each adapted to generate vibration and each separately fixedly attached to an interior surface of the housing within the internal cavity to transmit the vibration generated thereby to the housing. Wireless communication with the portable flow aid devices causes the vibration motors to generate the vibrations and thereby apply a localized vibration to portions of a bulk powder within a container and in contact with the housing of the portable flow aid device to promote flow of the bulk powder within the container.

20 Claims, 5 Drawing Sheets

(56) References Cited

U.S. PATENT DOCUMENTS

| | | | | |
|---|---|---|---|---|
| 2003/0024945 A1* | 2/2003 | DaSilva | ................ | B65D 88/66 |
| | | | | 222/1 |
| 2011/0114662 A1* | 5/2011 | Saunders | ............... | B65G 65/44 |
| | | | | 222/1 |
| 2016/0214790 A1* | 7/2016 | Mortensen | ............. | B65D 88/26 |

OTHER PUBLICATIONS

ASABE, Feb. 2008 (R2017ED), ANSI/ASAE S319.4; "Method of Determining and Expressing Fineness of Feed Materials by Sieving", ASABE, St. Joseph, MI, (9 pages).

NFTA; (2006), Methods 2.1.4-Dry Matter by Oven Drying for 3 hr at 105C., National Forage Testing Association, Omaha, NE, (4 pages).

Roberts, A.W., "Vibration of Fine Powders and Its Application", (1997) Handbook of Powder Science and Technology, 2nd Edition, Fayed, M.E. and Otten L. (eds) (Chapman & Hall, New York, USA), Chapter 5 (56 pages).

Shapa Technical Bulletin No. 12 (2007) "Discharge Aids" (n.d)., UK, Woodcock, C.R., & Mason, U.S. (1988). Bulk Solids Handling: An Introduction to the Practice and Technology, Astronomy and Astophysics, (37 pages).

\* cited by examiner

Table 1: This table compares the mass flow rate of DDGS with and without the use of the instrument.

| Trial # | Flow rate of DDGS without the instrument (kg/s) | Flow rate of DDGS with the instrument (kg/s) | Effectiveness |
|---|---|---|---|
| Hopper angle- 42° | | | |
| 1 | 0.512 | 0.563 | 9.961 |
| 2 | 0.355 | 0.417 | 17.464 |
| 3 | 0.651 | 0.718 | 10.292 |
| 4 | 0.215 | 0.252 | 17.209 |
| 5 | 0.206 | 0.240 | 16.504 |
| Hopper angle- 45° | | | |
| 1 | 0.775 | 0.950 | 22.581 |
| 2 | 1.069 | 1.253 | 17.21 |
| 3 | 1.161 | 1.302 | 30.20 |
| 4 | 0.560 | 0.709 | 26.61 |
| 5 | 0.530 | 0.801 | 51.13 |
| Hopper angle- 60° | | | |
| 1 | 0.217 | 0.235 | 8.295 |
| 2 | 0.204 | 0.253 | 24.019 |
| 3 | 0.259 | 0.272 | 5.019 |
| 4 | 0.222 | 0.243 | 9.460 |
| 5 | 0.296 | 0.351 | 18.581 |

FIG. 5

Table 2. Measured value of acceleration and displacement of the designed powder flow aid and the massage ball.

| Parameter | Portable flow aid | Massage ball |
|---|---|---|
| Acceleration at Low frequency (10 Hz – 1 KHz) | 21 m/s$^2$ | 6.7 m/s$^2$ |
| Acceleration at High frequency (10 KHz – 15 KHz) | 37.2 m/s$^2$ | 0.2 m/s$^2$ |
| Displacement | 0.27e-03 | 0.299 e-03 |

FIG. 6

Table 3: Mass flow rate comparison between massage ball and the powder flow aid.

| Trial # | Mass flow rate of DDGS without assistance, Kg/s (1) | Mass flow rate of DDGS with flow aid, Kg/s (2) | Mass flow rate of DDGS with massage ball, Kg/s (3) | Effectiveness of flow aid device, % (2) over (1) | Effectiveness of massage ball, % (3) over (1) | Effectiveness of flow aid over massage ball, % (3) over (2) |
|---|---|---|---|---|---|---|
| 1 | 0.53 | 0.80 | 0.77 | 51.13 | 44.91 | 4.30 |
| 2 | 0.76 | 0.77 | 0.76 | 0.82 | 0.12 | 0.70 |
| 3 | 0.76 | 0.79 | 0.77 | 3.14 | 0.64 | 2.48 |
| 4 | 0.84 | 0.91 | 0.87 | 8.45 | 3.57 | 4.71 |
| 5 | 1.02 | 1.11 | 1.07 | 8.52 | 4.41 | 3.94 |
| 6 | 1.11 | 1.21 | 1.07 | 8.56 | -3.24 | 12.20 |
| 7 | 1.16 | 1.30 | 1.09 | 12.14 | -6.20 | 19.56 |

FIG. 7

SYSTEMS, DEVICES, AND METHODS FOR PROMOTING BULK POWDER FLOW

CROSS-REFERENCE TO RELATED APPLICATIONS

This application claims the benefit of U.S. Provisional Application No. 62/853,249, filed May 28, 2019, the contents of which are incorporated herein by reference.

BACKGROUND OF THE INVENTION

The present invention generally relates to bulk powder handling equipment and methods. The invention particularly relates to portable flow aid devices that may be inserted directly into a container that contains a powder and then operated remotely to promote flow of the powder through or within the container.

Flowability of a powder through bulk storage containers, hoppers, bins, or the like (collectively referred to hereinafter as containers) is an important attribute in bulk solids handling and processing. Some common causes of erratic flow of a powder include "rat-holing," "arching," and "bridging." Rat-holing occurs when portions of the powder flow through the center of the container while other portions tend to adhere to or otherwise linger or remain adjacent the walls of the container. The erratic flow brought about by rat-holing can in turn lead to the formation of arches in a container's outlet, referred to as arching. Arching in a powder container may be in the form of an interlocking arch resulting from particles interlocking with each other or in the form of a cohesive arch resulting from particles adhering to each other.

To overcome these flow challenges, it is common to use flow enhancers or mechanical flow aids. Flow aids can be broadly classified as either active or passive devices. Active devices include vibration systems, pneumatic devices, and mechanical devices and are grouped based on their operating principle, that is, vibration, pneumatic, or mechanical. A particularly common technique for disruption of arching and/or bridging is the application of vibrations to improve powder flow. Such application of vibration to granular media is known to decrease the cohesion, friction, and shear strength between the particles. These effects tend to produce shear and compression deformations which ultimately increase the flowability of bulk solids.

Flow aids that use vibration as a mechanism to dilate powders generally include air-powered pistons, electromagnetic devices, and/or rotary eccentric devices. In general, these devices are located on an exterior of the container and transfer energy from the device to a wall of the container which further transfers the energy to powders within the container to disrupt bridging and promote powder dilation and flow. However, continued impacts on container walls may affect their structural integrity, and prolonged use of these devices can permanently damage the containers.

In addition to the above, the frequency of vibration has a major influence on powder properties. Application of relatively low-frequency vibrations to a closed system of bulk solids can lead to compaction while higher frequency vibrations can cause dilation or compaction. Dilation or compaction will depend on the powder properties such as particle size, particle size distribution, density, and porosity. These vibration-based flow aids often have fixed operating parameters irrespective of the type of powder stored in the container, and do not allow for control over vibration frequency or vibration patterns.

In view of the above, it can be appreciated that there are certain problems, shortcomings or disadvantages associated with existing powder flow aids, including the risk of compromising the structural integrity of a container and the inability to tailor the frequency and pattern of vibrations for a given container and powder.

BRIEF DESCRIPTION OF THE INVENTION

The present invention provides systems, devices, and methods capable of promoting bulk powder flow in containers.

According to one aspect of the invention, a portable flow aid device includes a housing having an enclosed internal cavity therein, at least two vibration motors each adapted to generate vibration and each separately fixedly attached to an interior surface of the housing within the internal cavity to transmit the vibration generated thereby to the housing, a microcontroller within the internal cavity configured to control operations of the vibration motors, and at least one power supply within the internal cavity of the housing to power the vibration motors and the microcontroller.

According to another aspect of the invention, a system includes a portable flow aid device comprising a housing having an enclosed internal cavity therein, at least two vibration motors each adapted to generate vibration and each separately fixedly attached to an interior surface of the housing within the internal cavity to transmit the vibration generated thereby to the housing, a microcontroller within the internal cavity configured to control operations of the vibration motors, and at least one power supply within the internal cavity of the housing to power the vibration motors and the microcontroller. The system further includes a remote electronic device that wirelessly communicates with the microcontroller and comprises software that controls the microcontroller.

According to another aspect, a method of promoting flow of a bulk powder within a container includes inserting one or more portable flow aid devices into an internal compartment of the container to directly contact the bulk powder therein. The portable flow aid devices each have a housing having an enclosed internal cavity therein and at least two vibration motors each adapted to generate vibration and each separately fixedly attached to an interior surface of the housing within the internal cavity to transmit the vibration generated thereby to the housing. Wireless communication with the portable flow aid devices causes the vibration motors to generate the vibrations and thereby apply a localized vibration to portions of the bulk powder contacting the housing of the portable flow aid device to promote flow of the bulk powder within the container.

Technical effects of certain aspects of the invention as described above preferably include the ability to readily place a portable flow aid device directly into a bulk powder within a container to promote the flow of the powder within the container without modifying or damaging the container.

Other aspects and advantages of this invention will be appreciated from the following detailed description.

DETAILED DESCRIPTION OF THE INVENTION

Disclosed herein are portable flow aid devices sized and configured to be placed within an internal compartment of a container and in direct contact with a powder within the container to apply localized vibration to the powder to improve its flow characteristics within the container and, in some cases, as the powder exits the container. In preferred embodiments, operation of the flow aid devices is controlled remotely with an external device, such as but not limited to a computer, laptop, tablet computer, smart phone, or other controller. The flow aid devices are also preferably capable of generating vibration whose frequency and pattern can be controlled through the external device or with a controller within the device.

Figures 1, 2:
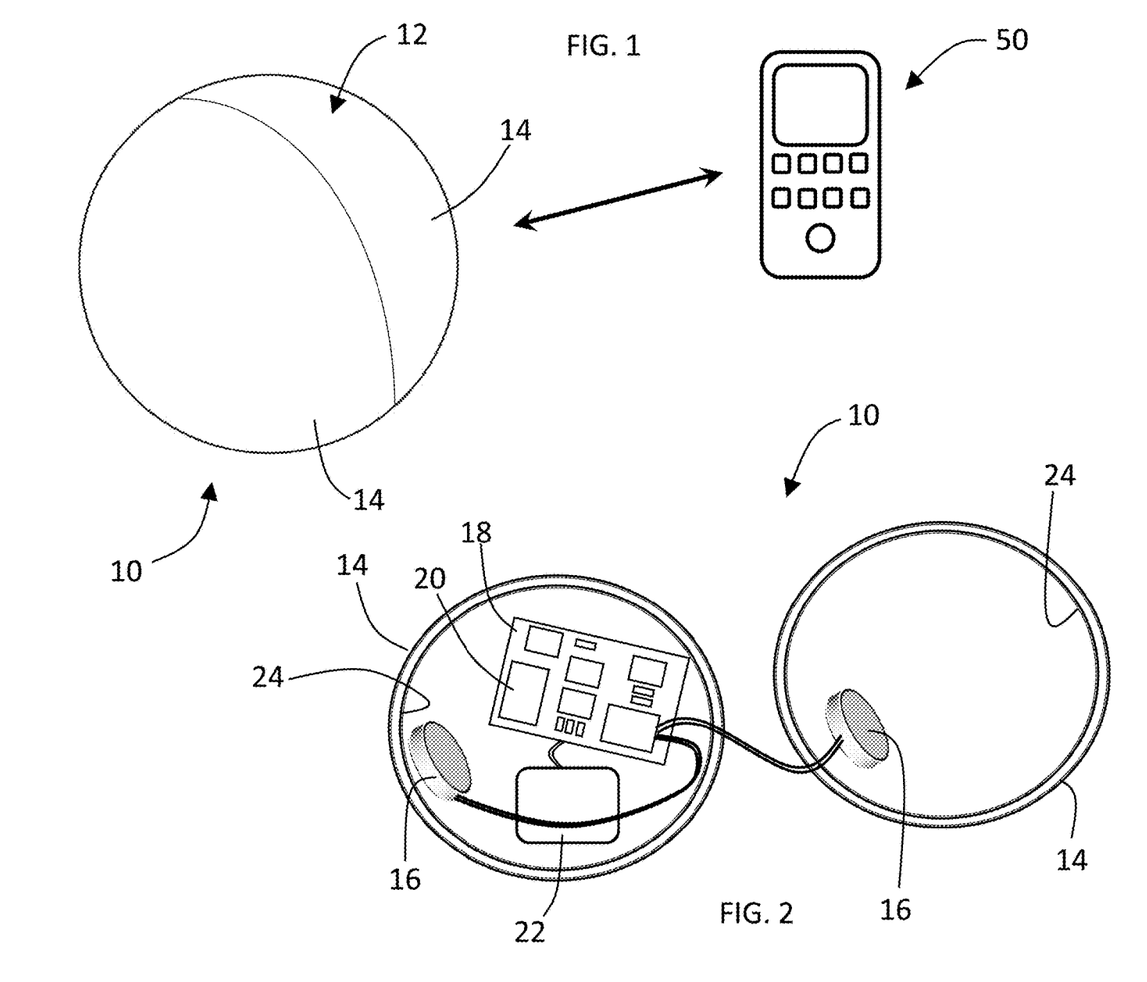
FIGS. 1 and 2 schematically represent a portable flow aid device in accordance with certain nonlimiting aspects of the present invention.

FIGS. 1 and 2 schematically represent a nonlimiting embodiment of a portable flow aid device 10. The flow aid device 10 is represented in FIG. 1 as having a housing 12 that has a spherical outer shape and is formed by two hemispherical housing members 14. The housing 12 is represented in FIG. 2 as disassembled to reveal internal components within an internal cavity of the housing 12. Though the housing 12 may be fabricated from various materials to have various shapes and sizes depending on the particular application, an experimental flow aid device 10 used in investigations reported below had a metallic housing 12 fabricated from stainless steel (Grade 304) to have an outer diameter of about 56.59 mm. The housing members 14 preferably engage each other in a manner that encloses and optionally seals the internal cavity of the housing 12.

In the nonlimiting embodiment of FIG. 2, the internal components include a pair of coin cell vibration motors 16, a printed circuit board (PCB) 18 including a microcontroller 20 for controlling the vibration motors 16, and a power supply 22, such as a battery pack. The vibration motors 16 are fixedly attached to an interior surface 24 of each housing member 14, such that the motors 16 are disposed in separate hemispheres of the housing 12. Although two vibration motors 14 are shown, it is within the scope of the invention that the flow aid device 10 could include more than two vibration motors 16. Additional internal components may be included, as nonlimiting examples, various sensors to measure parameters such as pressure, temperature, and/or humidity.

Figure 3:
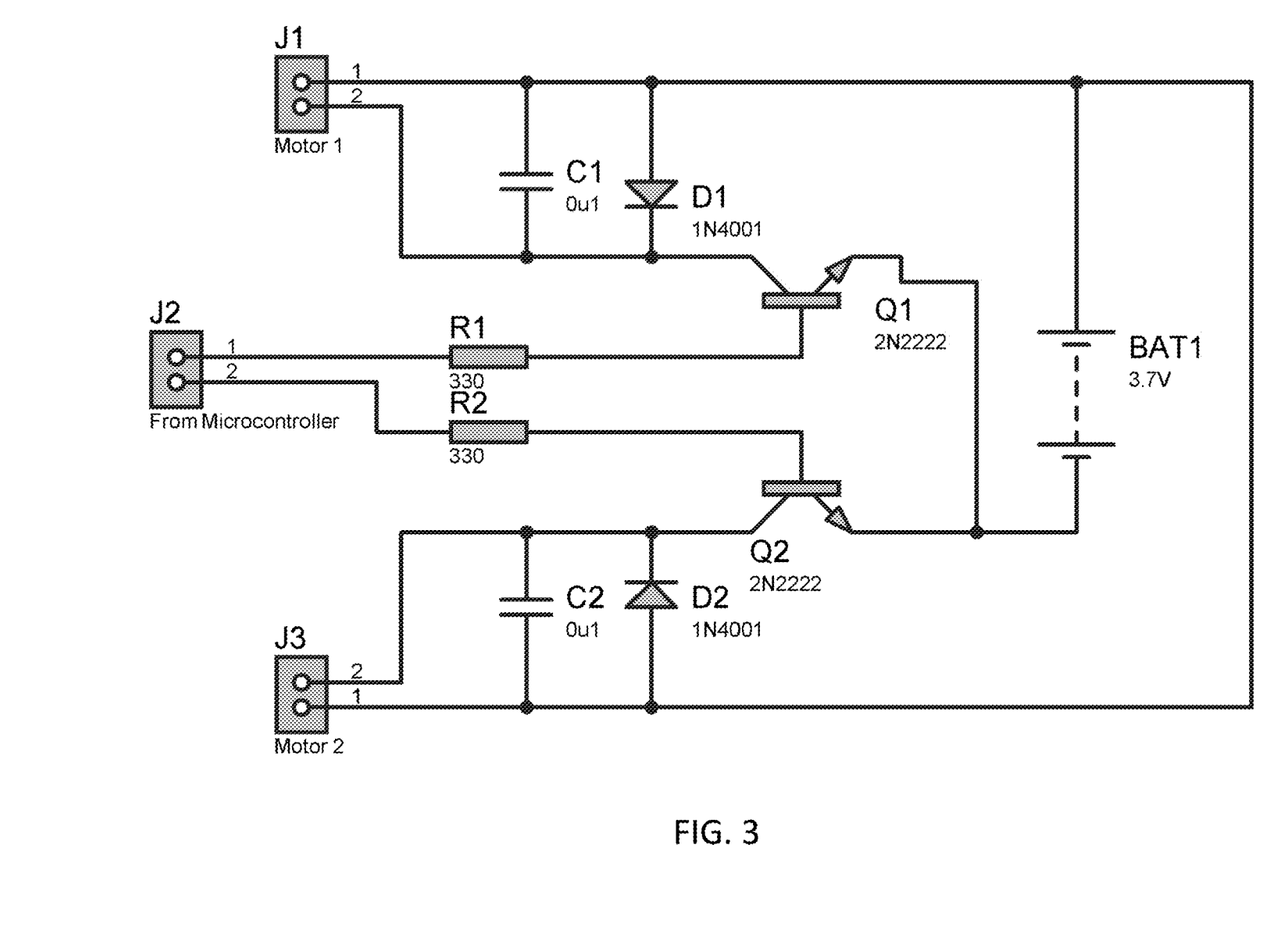
FIG. 3 is a wiring diagram schematically representing connections between internal components of the flow aid device of FIGS. 1 and 2.

In the particular embodiment utilized in investigations leading to the invention, the microcontroller 20 was an ATmega328P-based microcontroller (Bluno beetle BLE) with BLUETOOTH® low energy (BLE) 4.0 support. As known in the art, BLUETOOTH® refers to a wireless technology standard for exchanging data between devices over short distances using short-wavelength UHF radio waves in the industrial, scientific and medical radio bands, from 2.400 to 2.485 GHz. For the investigations, the microcontroller 20 was programmed using the Arduino integrated development environment (IDE), and the microcontroller 20 and PCB 18 were powered separately with the power supply 22. FIG. 3 is a wiring diagram schematically representing the connections of the internal components.

The BLE chip of the microcontroller 20 provided the flow aid device 10 with the capability to communicate with a smart phone 50, as schematically represented in FIG. 1. The smart phone 50 used in the investigations used the Android operating system commercially available from Google LLC. A separate Android-based software application was developed and used on the smart phone 50 to interface with and remotely control the flow aid device 10. In embodiments in which the flow aid device 10 includes one or more internal sensors, the BLE chip may be used to transmit the outputs of the sensors to the phone 50 or another remote receiver.

The application operating on the phone 50 enabled a user to remotely start and stop the operation of each individual vibration motor 16. The application also permitted a delay to be programmed between the starting of the individual motors 16 so that the amplitudes of the vibrations produced by the motors 16 were not in-phase with each other (as a nonlimiting example, 180 degrees out of phase with each other) so that the vibrations generated by the motors 16 would not cancel out one another. The delay was found to be effective in imparting motion to the housing 12, which in turn was transferred to powder in contact with the housing 12.

Nonlimiting embodiments of the invention will now be described in reference to experimental investigations leading up to the invention.

Powder properties have a profound influence on the flowability of the powder. For the investigations, distiller's dried grains with solubles (DDGS) were used as the test powder. Different tests were conducted to characterize and assess the flow properties of the powder prior to testing the flow aid device 10. The mean bulk density of the powder was determined to be 444.09 kg/m$^3$, which was similar to values reported by previous works. For particle size, the geometric mean diameter of the powder was determined to be 0.75 mm. The moisture content of the powder was determined to be 8.42 percent.

Figure 4:
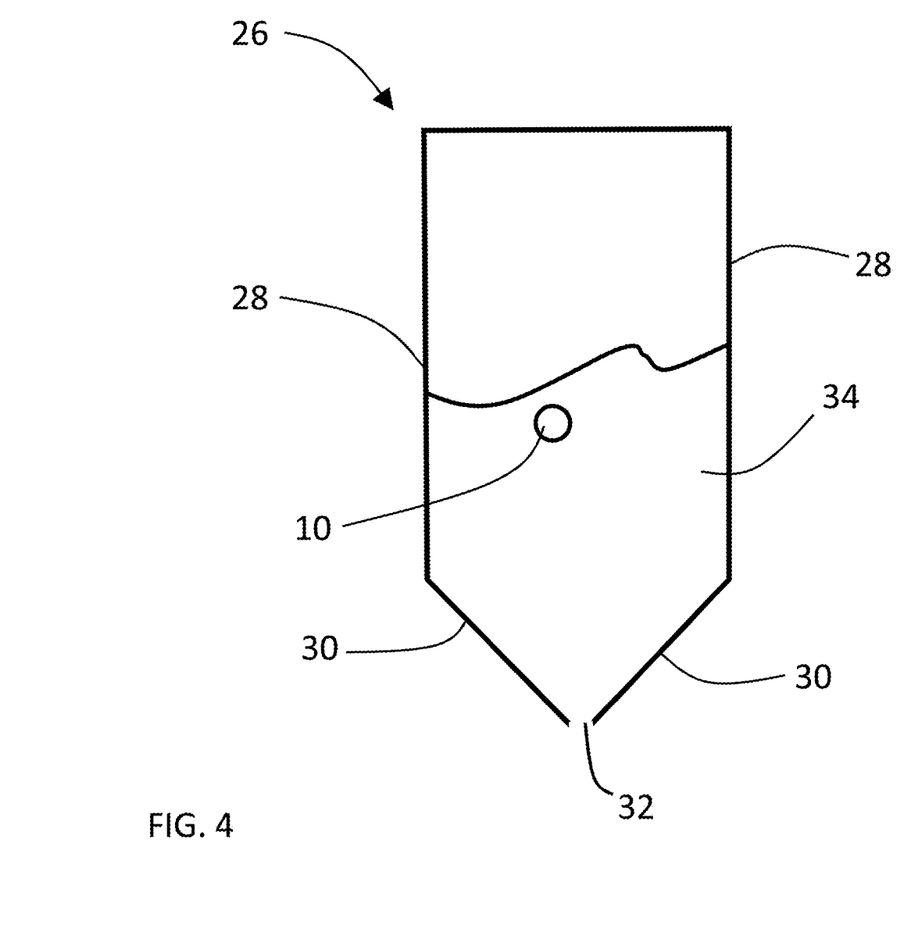
FIG. 4 schematically represents a cross-sectional side view of a container in which a powder material is contained and in which the portable flow aid device of FIGS. 1 and 2 has been placed to promote the flow of the powder material from an outlet of the lower end of the container.

FIG. 4 schematically represents a cross-sectional side view of a container 26 used in these investigations. The container 26 included two fixed walls (not shown) and two adjustable walls 28 that defined a rectangular-shaped cross-sectional area within the container 26. The lower portions 30 of the adjustable walls 28 each included a hinge that enabled the adjustable walls 28 to incline at the bottom of the container 26 at an angle, creating a tapered shape that terminated at a rectangular-shaped outlet 32 at the lower-most extent of the container 26. During the investigations, the lower portions 30 of the adjustable walls 28 were varied to obtain outlet angles of 42°, 45°, and 60° relative to horizontal. A gate (not shown) was provided at the outlet 32 to control the outflow of a powder 34 through the outlet 32. The length of the rectangular outlet was about 285 mm and the width was about 6 mm. FIG. 4 represents the flow aid device 10 inside the container 26 and embedded in the powder 34 within the container 26.

Figure 5:
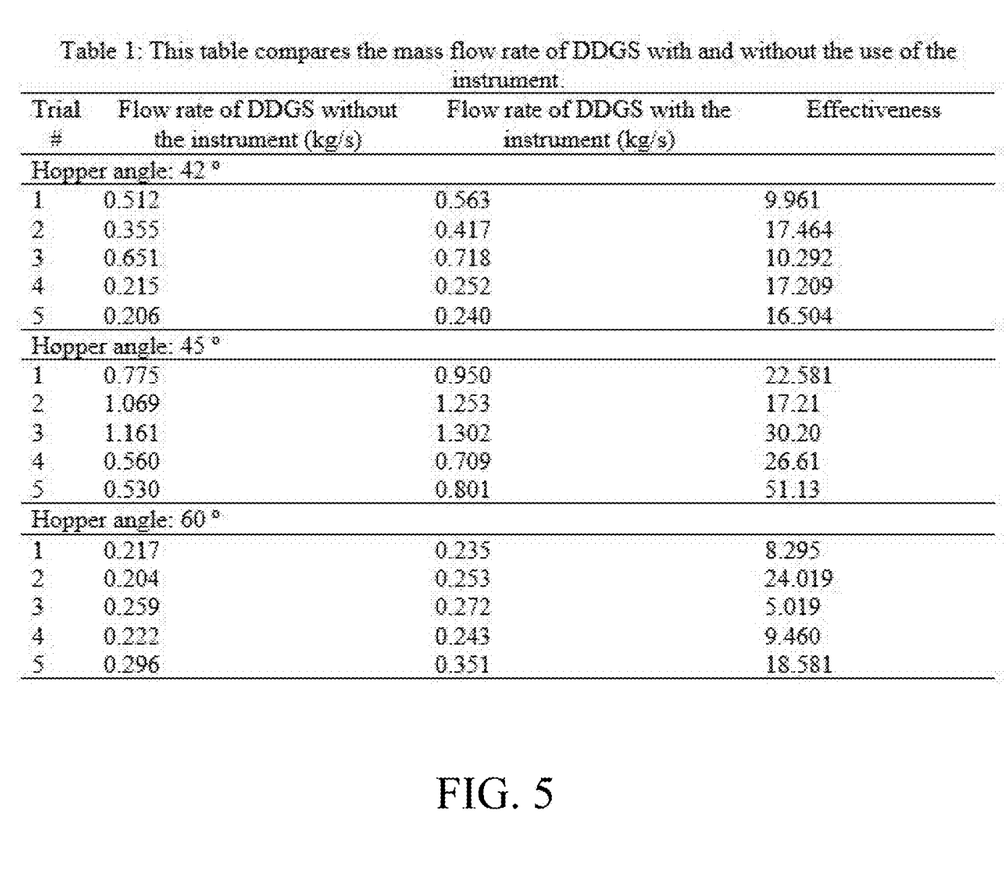
FIGS. 5, 6, and 7 contain, respectively, Tables 1, 2, and 3 that include data obtained during investigations leading to the present invention.

The effectiveness of the flow aid device 10 was first analyzed by comparing flow through the container 26 with and without the flow aid device 10. Five trials at each outlet angle were performed. Table 1 of FIG. 5 evidences an improvement in powder flow rate resulting from the use of the flow aid device 10 at the different outlet angles. The flow aid device 10 improved the mean flow rate of the powder by an average of about 14 percent at an outlet angle of 42°, about 13 percent at an outlet angle of 60°, and about 30 percent at an outlet angle of 45°.

Figure 6:
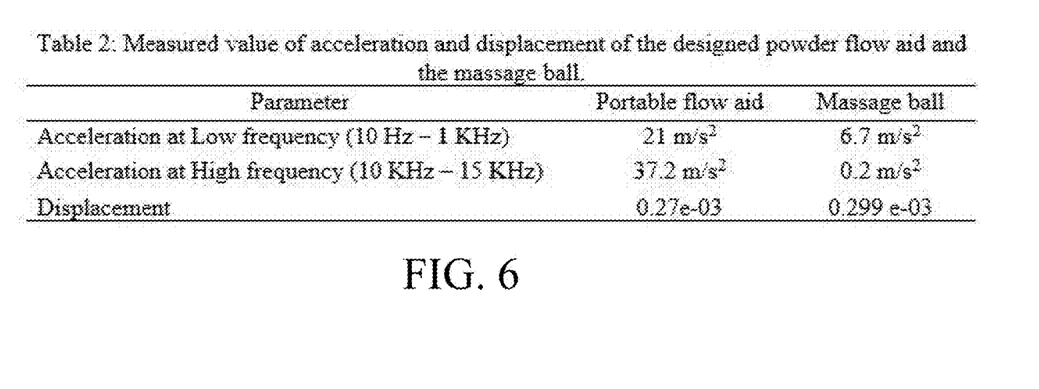

The vibration characteristics of the experimental flow aid device 10 were then analyzed in comparison to those of a commercial vibrating massage ball. The massage ball had a diameter of 88.13 mm, in comparison to the smaller experimental flow aid device (56.59 mm). The massage ball utilized a vibration motor that was quite different from the motors 16 of the experimental device 10. Specifically, whereas the flow aid device 10 contained two coin cell vibration motors 16 that were directly attached to the interior surface of the housing 12 and had no external moving parts, the massage ball contained a relatively large motor with eccentric loading. A vibration meter (Wintact WT63A, Shenzhen Wintact Electronics Company Limited, China) quantified the acceleration of both the flow aid device 10 and the massage ball at high and low frequencies. The determined frequencies of the flow aid device 10 and massage ball were 262 Hz and 106 Hz, respectively. Vibration acceleration and displacements of both devices were measured to gauge their vibration intensities. As shown in Table 2 of FIG. 6, the acceleration of the flow aid device 10 was significantly higher than the massage ball.

Figure 7:
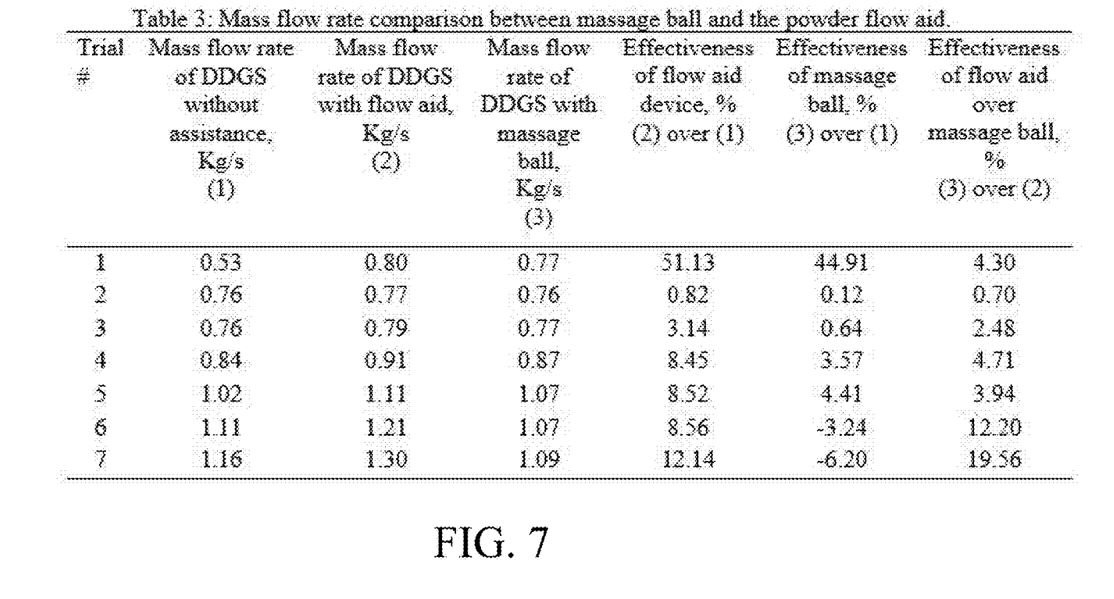

The comparative effects on flow rate resulting from the flow aid device 10 and massage ball were then evaluated with the same DDGS powder 34 and container 26 used in the first series of trials, and with the outlet angle set at 45°. Seven trails were each conducted without any device, with the experimental flow aid device 10, and with the massage ball. The results are summarized in Table 3 of FIG. 7 and evidence that the flow aid device 10 was more effective in promoting flow through the container outlet 32 than the massage ball. Though not wishing to be held to any particular theory, this performance difference may have been attributable to the higher-frequency vibration and/or the smaller diameter of the flow aid device 10 relative to the massage ball. The stainless steel housing of the flow aid device 10 may also have had an effect by facilitating a higher transmission of vibration from the housing 12 and into the surrounding powder 34. It was observed that at higher powder mass flow rates, the lower-frequency vibrations of the massage ball actually decreased the overall flow rate. This may have been due to the consolidation of powder leading to bridging within the container 26.

The investigations reported above indicated that a flow aid device 10 with the characteristics disclosed above can provide improvements in the flow rate of a powder within a container. A preferred but nonlimiting embodiment of the flow aid device 10 comprises a metallic housing 12 and at least two vibration motors 16 that are attached to interior surfaces of the housing 12 and operate at a frequency of about 30 to about 500 Hz. In addition to providing portability and energy efficiency, the flow aid device 10 provides advantages over many existing mechanical flow aid devices in that it does not directly impart forces to the container and is therefore less likely to cause damage to the container. Furthermore, localized control of vibration (e.g., avoiding energy input to the container structure where there is no powder buildup or flow hindrance) may further improve powder handling efficiency.

Although methods described herein have used only one flow aid device 10, multiple flow aid devices 10 may be used within a single bulk powder container to improve flow characteristics. If multiple flow aid devices 10 are used, their operations could be synchronized in various ways. Preferred numbers of flow aid devices 10 and their operation may depend at least in part on the size and shape of the container and the characteristics of the powder. During the investigations, it was determined that a single flow aid device 10 could improve the flow of about 60 pounds (about 27 kg) of DDGS powder. If multiple flow aid devices 10 were used, they may or may not be simultaneously operational. For example, similar to the concept of firing order, the flow aid devices 10 could be started and stopped in a definite pattern to affect an improvement in flowability within the container. This could provide control over the location of actuation within the container, as well as control over vibration based on specific powder properties. Multiple flow aid devices 10 may be controlled using software on a single remote device, such as the aforementioned smart phone 50 or other suitable device.

While the invention has been described in terms of specific or particular embodiments and investigations, it should be apparent that alternatives could be adopted by one skilled in the art. For example, the flow aid device 10 and its components could differ in appearance and construction from the embodiments described herein and shown in the drawings, functions of certain components of the flow aid could be performed by components of different construction but capable of a similar (though not necessarily equivalent) function, and various materials could be used in the fabrication of the flow aid device 10 and/or its components. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A portable flow aid device configured to be placed within an internal compartment of a container and in direct contact with a bulk powder within the internal compartment to apply localized vibration to the bulk powder to improve flow characteristics thereof within the container, the portable flow aid device comprising:
   a housing having an enclosed internal cavity therein;
   at least two vibration motors each adapted to generate vibration and each separately fixedly attached to an interior surface of the housing within the internal cavity to transmit the vibration generated thereby to the housing;
   a microcontroller within the internal cavity configured to control operations of the vibration motors; and
   at least one power supply within the internal cavity of the housing to power the vibration motors and the microcontroller.

2. The portable flow aid device of claim 1, wherein the housing has a spherical outer shape formed by two hemispherical housing members and the vibration motors are separately disposed in the hemispherical housing members.

3. The portable flow aid device of claim 1, wherein the vibration motors operate at a frequency of about 30 to about 500 Hz.

4. The portable flow aid device of claim 1, wherein the portable flow aid device is a component of a system comprising a remote electronic device that wirelessly communicates with the microcontroller and comprises software that controls the microcontroller.

5. The portable flow aid device of claim 4, wherein the remote electronic device wirelessly communicates with the microcontroller by short-wavelength UHF radio waves.

6. The portable flow aid device of claim 4, wherein the remote electronic device is a smart phone.

7. The portable flow aid device of claim 4, wherein the operations of the vibration motors controlled by the software through the microcontroller comprise starting the vibration generated by each of the vibration motors individually, stopping the vibration generated by each of the vibration motors individually, and delaying the starting of the vibration generated by a first of the vibration motors relative to the starting of the vibration generated by a second of the vibration motors so that amplitudes of the vibrations produced by the vibration motors are not in-phase with each other.

8. The portable flow aid device of claim 1, wherein the housing is formed of a metallic material.

9. A method of using the portable flow aid device of claim 1, the method comprising:
placing the portable flow aid device in a bulk powder contained within an internal compartment of a container and embedding the portable flow aid device in the bulk powder to directly contact portions of the bulk powder; and
operating the portable flow aid device to generate the vibrations of the vibration motors and thereby apply a localized vibration to the portions of the bulk powder contacting the housing of the portable flow aid device to promote flow of the bulk powder within the container.

10. A system comprising:
a portable flow aid device configured to be placed within an internal compartment of a container and in direct contact with a bulk powder within the internal compartment to apply localized vibration to the bulk powder to improve flow characteristics thereof within the container, the portable flow aid device comprising a housing having an enclosed internal cavity therein, at least two vibration motors each adapted to generate vibration and each separately fixedly attached to an interior surface of the housing within the internal cavity to transmit the vibration generated thereby to the housing, a microcontroller within the internal cavity configured to control operations of the vibration motors, and at least one power supply within the internal cavity of the housing to power the vibration motors and the microcontroller; and
a remote electronic device that wirelessly communicates with the microcontroller and comprises software that controls the microcontroller.

11. The system of claim 10, wherein the housing has a spherical outer shape formed by two hemispherical housing members and the vibration motors are separately disposed in the hemispherical housing members.

12. The system of claim 10, wherein the vibration motors operate at a frequency of about 30 to about 500 Hz.

13. The system of claim 10, wherein the remote electronic device wirelessly communicates with the microcontroller by short-wavelength UHF radio waves.

14. The system of claim 10, wherein the remote electronic device is a smart phone.

15. The system of claim 10, wherein the operations of the vibration motors controlled by the software through the microcontroller comprise starting the vibration generated by each of the vibration motors individually, stopping the vibration generated by each of the vibration motors individually, and delaying the starting of the vibration generated by a first of the vibration motors relative to the starting of the vibration generated by a second of the vibration motors so that amplitudes of the vibrations produced by the vibration motors are not in-phase with each other.

16. The system of claim 10, wherein the housing is formed of a metallic material.

17. A method of using the system of claim 10, the method comprising:
placing the portable flow aid device in a bulk powder contained within an internal compartment of a container and embedding the portable flow aid device in the bulk powder to directly contact portions of the bulk powder; and
wirelessly communicating with the portable flow aid device to generate the vibrations of the vibration motors and thereby apply a localized vibration to the portions of the bulk powder contacting the housing of the portable flow aid device to promote flow of the bulk powder within the container.

18. A method of promoting flow of a bulk powder within a container, the method comprising:
inserting one or more portable flow aid devices into an internal compartment of the container and embedding at least one of the one or more portable flow aid devices in the bulk powder within the container to directly contact portions of the bulk powder, the portable flow aid devices each comprising a housing having an enclosed internal cavity therein and at least two vibration motors each adapted to generate vibration and each separately fixedly attached to an interior surface of the housing within the internal cavity to transmit the vibration generated thereby to the housing; and
wirelessly communicating with the portable flow aid devices to generate the vibrations of the vibration motors and thereby apply a localized vibration to the portions of the bulk powder contacting the housing of the portable flow aid device to promote flow of the bulk powder within the container.

19. The method of claim 18, wherein the vibration motors are controlled to delay starting of the vibration generated by a first of the vibration motors relative to the starting of the vibration generated by a second of the vibration motors so that amplitudes of the vibrations produced by the vibration motors are not in-phase with each other.

20. The method of claim 18, further comprising operating the vibration motors at a frequency of about 30 to about 500 Hz.

* * * * *